United States Patent
Lin et al.

(10) Patent No.: US 11,614,655 B1
(45) Date of Patent: Mar. 28, 2023

(54) DISPLAY DEVICE

(71) Applicant: Qisda Corporation, Taoyuan (TW)

(72) Inventors: Meng-Wei Lin, Taoyuan (TW);
Yi-Cheng Kuo, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 17/727,905

(22) Filed: Apr. 25, 2022

(30) Foreign Application Priority Data

Sep. 28, 2021 (TW) ................................. 110136082

(51) Int. Cl.
*G02F 1/13357* (2006.01)
*G02F 1/1335* (2006.01)

(52) U.S. Cl.
CPC .. *G02F 1/133603* (2013.01); *G02F 1/133605* (2013.01); *G02F 1/133614* (2021.01); *G02F 1/133617* (2013.01)

(58) Field of Classification Search
CPC ......... G02F 1/133603; G02F 1/133605; G02F 1/133614; G02F 1/133617; F21V 7/30; F21V 7/28
See application file for complete search history.

(56) References Cited

U.S. PATENT DOCUMENTS

| | | | |
|---|---|---|---|
| RE48,689 E * | 8/2021 | Cho | G02B 6/0011 |
| 2019/0243172 A1* | 8/2019 | Gotou | G02F 1/1336 |
| 2021/0149253 A1* | 5/2021 | Zhang | G02F 1/133605 |

FOREIGN PATENT DOCUMENTS

| | | | | |
|---|---|---|---|---|
| CN | 105068315 A | * | 11/2015 | ....... G02F 1/133603 |
| JP | 6889014 B2 | * | 6/2021 | ................ F21S 2/00 |
| JP | 6951109 B2 | * | 10/2021 | ................ F21S 2/00 |
| WO | WO-2018193691 A1 | * | 10/2018 | ................ F21S 2/00 |

* cited by examiner

*Primary Examiner* — Erin Kryukova

(57) ABSTRACT

A display device includes a display panel and a backlight module. The backlight module is arranged under the display panel. The backlight module includes a matrix of light sources and a reflective sheet. The reflective sheet is disposed around or on at least one corner of the matrix of light sources. The reflective sheet has an upper edge, a reflective surface and a lower edge. The upper edge is far away from the matrix of light sources relative to the lower edge. A light conversion coating having a plurality of dots of different sizes is formed on the reflective surface. The matrix of light sources emits a first light toward the reflective sheet, and the first light is changed by the light conversion coating to form a second light, wherein the first light and the second light are of different colors.

20 Claims, 3 Drawing Sheets

DISPLAY DEVICE

This application claims the benefit of Taiwan application Serial No. 110136082, filed Sep. 28, 2021, the subject matter of which is incorporated herein by reference.

BACKGROUND OF THE INVENTION

Field of the Invention

The invention relates in general to a display device, and more particularly to a display device using direct light source.

Description of the Related Art

Flat panel displays enable thinning of many electronic devices. Most of the current flat panel displays use a backlight module to emit light to display images, so that the backlight module is one of the important components of the flat panel display. In order to make the light output more uniform and increase the brightness, most of the backlight modules use blue light emitting diodes (LEDs) as the light source. However, in order to make the display meet the requirement of narrow frame, the frame of the display is getting narrower, and the light mixing effect at the edge of the backlight module is not good, and thus it will result in light leakage at the edge of the display and affect the color uniformity of the images.

SUMMARY OF THE INVENTION

The present invention relates to a display device, which can improve the optical characteristic and light leakage problem of a backlight module, so as to improve the color uniformity of display images.

According to an aspect of the present invention, a display device is provided, comprising a display panel and a backlight module, the backlight module is disposed under the display panel, and the backlight module includes a matrix of light sources and a reflective sheet. The reflective sheet is arranged around or on at least one corner of the matrix of light sources, the reflective sheet has an upper edge, a reflective surface and a lower edge, the upper edge is far away from the matrix of light sources relative to the lower edge, a light conversion coating having a plurality of dots of different sizes is formed on the reflective surface, the matrix of light sources emits a first light toward the reflective sheet, and the first light is changed by the light conversion coating to form a second light, wherein the first light and the second light are of different colors.

According to an aspect of the present invention, a display device is provided, which includes a display panel and a backlight module, the backlight module is disposed under the display panel, and the backlight module includes a matrix of light sources and a reflective sheet. The reflective sheet is arranged around or on at least one corner of the matrix of light sources, the reflective sheet has an upper edge, a reflective surface and a lower edge, the upper edge is far away from the matrix of light sources relative to the lower edge, and a light conversion coating having a plurality of dots is formed on the reflective surface. The matrix of light sources emits a first light toward the reflective sheet, and the first light is changed by the light conversion coating to form a second light, wherein the first light and the second light are of different colors, wherein the plurality of dots are arranged on the reflective sheet from the lower edge by dot size, and the sizes of dots are sequentially increased from bottom to top.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
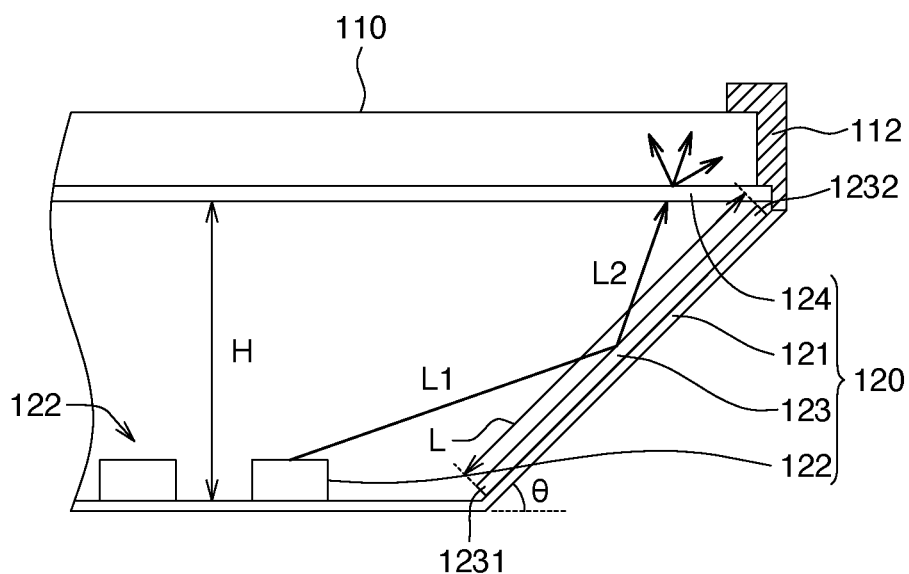
FIG. 1 is a partial side view of a display device according to an embodiment of the present invention.
Figure 2:
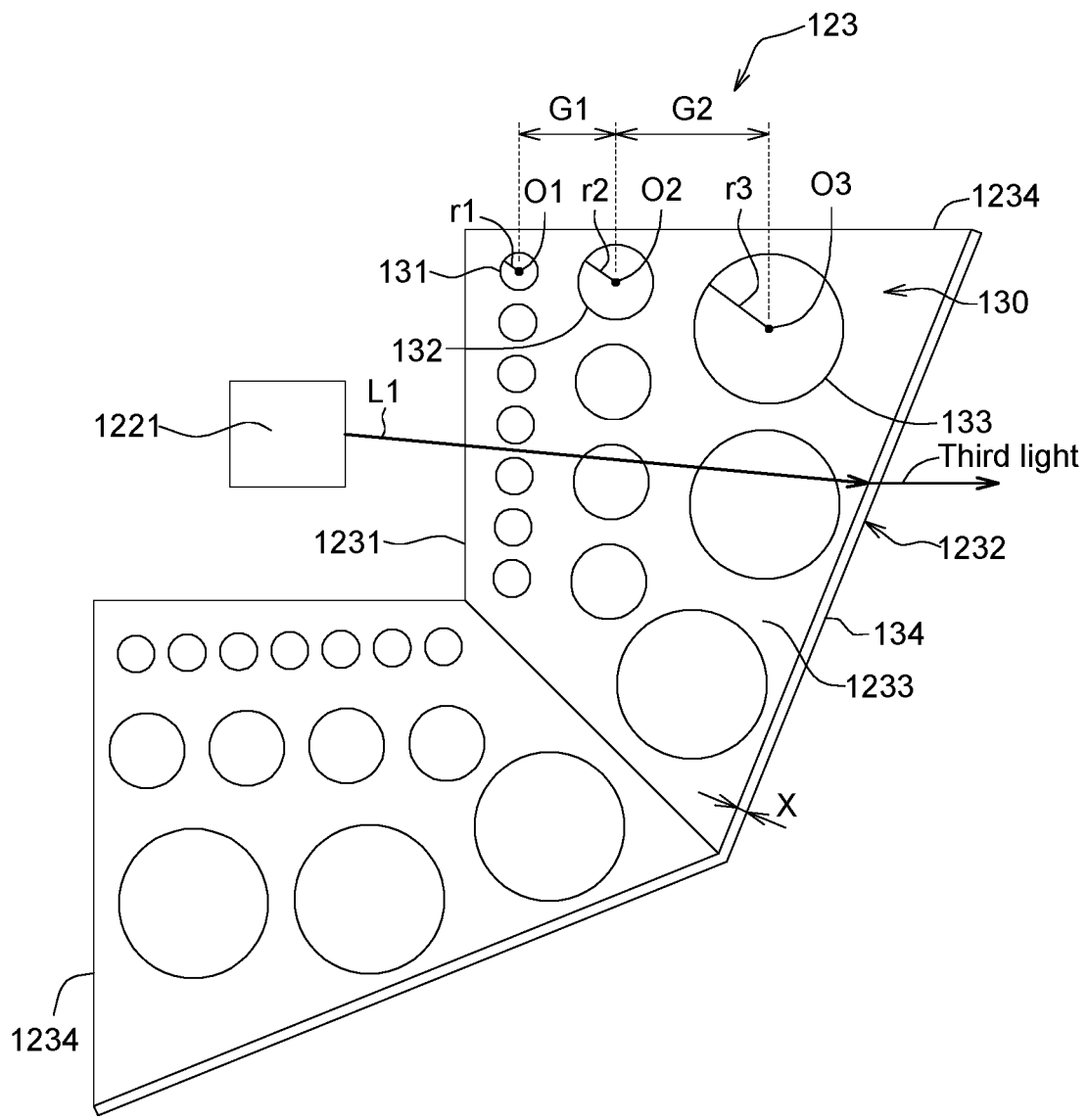
FIG. 2 is a schematic top view of a reflective sheet according to an embodiment of the present invention.

Please refer to FIGS. 1 and 2. FIG. 1 is a partial side view of the display device 100 according to an embodiment of the present invention, and FIG. 2 is a schematic top view of the reflective sheet 123 according to an embodiment of the present invention. The display device 100 includes a display panel 110 and a backlight module 120. The backlight module 120 is located below the display panel 110, and the backlight module 120 includes a back plate 121, a matrix of light sources 122, a reflective sheet 123 and at least one optical film 124. The matrix of light sources 122 is disposed on the back plate 121, and the reflective sheet 123 is disposed on at least one side of the back plate 121. The optical film 124 is disposed under the display panel 110 and between the display panel 110 and the back plate 121. In addition, a thin frame 112 is disposed around the display panel 110 to meet the requirement of narrow frame, for example.

The display panel 110 is, for example, a liquid crystal display panel, and the backlight module 120 is mainly used in the display device 100 as a backlight source of the display panel 110. In order to save power, the backlight module 120 is directed to a matrix of light sources 122 having direct-lit light emitting diodes (LEDs). However, the brightness distribution of the LEDs is uneven, and hot spot is often generated due to the excessive concentration of the brightness of the LEDs. A dark area between the two adjacent light-emitting diodes will appear due to uneven brightness, which affects the light uniformity of the backlight module 120. In addition, in the light-emitting area of the light-emitting diode, most of the light is concentrated in the central area (i.e., the light exits at a small angle relative to the central axis), so that the brightness of the central area is significantly greater than that of the surrounding area. In order to improve the problem of light uniformity, the optical film 124 can be disposed above the matrix of light sources 122.

The optical film 124 is disposed between the display panel 110 and the matrix of light sources 122. The light generated by the matrix of light sources 122 can be diffused and brightened through the optical film 124, so that the light is uniformly incident on the display panel 110. The optical film 124 is, for example, at least one of a diffuser, a brightness enhancement film (BEF), and a quantum dot film with a wide color gamut function, but the invention is not limited thereto. The quantum dot film uses a blue LED as the light source, and the quantum dot film will generate different colors of light (such as green light and red light) under the excitation of blue light, and then mix the blue light to form a high-quality white light.

In this embodiment, since the luminance value of the central area of the light emitting diode is greater than that of the surrounding area, a reflective sheet 123 is arranged around the matrix of light sources 122 or in the corner area, so that the light can be reflected by the reflective sheet 123 to reach the edge area or corner area of the display device 100, and after the light is uniformly distributed, the light exits the display panel 110 through the optical film 124. Therefore, the phenomenon that the conventional backlight module 120 is prone to hot spot and uneven brightness distribution can be avoided.

In one embodiment, the reflective sheet 123 is, for example, an aluminum plate, an aluminum film, or other high-reflectivity mirror-coated sheet, and the reflective sheet 123 has an upper edge 1232, a reflective surface 1233 and a lower edge 1231. The reflective sheet 123 extends obliquely or vertically between the upper edge 1232 and the lower edge 1231. As shown in FIG. 1, there is a length L between the upper edge 1232 and the lower edge 1231 of the reflective sheet 123, and a height H between the upper edge 1232 and the lower edge 1231 of the reflective sheet 123, the height of the reflective sheet 123 can be expressed as $H=L \times \sin \theta$, where $\theta$ is the inclination angle of the reflective sheet 123, for example, 90 degrees or less than 90 degrees.

In the embodiment, the upper edge 1232 of the reflective sheet 123 is close to the display panel 110 relative to the lower edge 1231, and the upper edge 1232 of the reflective sheet 123 is far from the matrix of light sources 122 relative to the lower edge 1231, and A light conversion coating 130 having a plurality of dots (e.g., 131 to 133) is formed on the reflection surface 1233, and the light conversion coating 130 can be used to solve the problem that the light mixing effect at the edge of the backlight module 120 is not good, resulting in light leakage at the edge of the display device 100 and affecting the color uniformity of the images.

Referring to FIG. 1, in an embodiment, the light conversion coating 130 is, for example, a green fluorescent coating, the matrix of light sources 122 is, for example, a blue light diode, and the matrix of light sources 122 can emit a first light L1 toward its surroundings or corners (for example, magenta light), the first light L1 can be changed by the light conversion coating 130 to form a second light L2 (for example, green light), wherein the first light L1 and the second light L2 are of different colors. In this embodiment, since the perovskite quantum dots on the optical film 124 will excite green light when excited by blue light, the light conversion coating 130 in this embodiment is a green fluorescent coating that can also generate green light on the reflective sheet 123, the output of green light in the surrounding area of the optical film 124 is increased, so that the magenta light, green light and blue light in the surrounding area are mixed to form high-quality white light. The problem of magenta light leakage at the edge or corners of the display device 100 has been improved.

In another embodiment, the first light L1 is such as blue light, and the first light L1 can be changed by the light conversion coating 130 to form a second light L2 (such as yellow light), wherein the first light L1 and the second light L2 are of different colors, and the first light L1 can be mixed with the second light L2 to form white light. Therefore, the light conversion coating 130 is not limited to a green fluorescent coating, but also a yellow fluorescent coating, which is not limited in the present invention.

As shown in FIG. 2, these dots include the first dots 131, the second dots 132 and the third dots 133 with sizes from small to large. The number is not limited to three and is not limited to a circle. For other geometric shapes (such as quadrilateral or hexagons). That is to say, the closer to the upper edge 1232 or the display panel 110, the larger the dot size on the reflective surface 1233, and the closer to the lower edge 1231 or the matrix of light sources 122, the smaller the dot size on the reflective surface 1233. Because the larger the dot size, the greater the reflected light intensity, the light mixing effect can be compensated for the edge of the display device 100.

As shown in FIG. 2, the first dot 131 has a first radius r1, the second dot 132 has a second radius r2, and the third dot 133 has a third radius r3. The dots 131 to 133 increase in size from the lower edge 1231 to the upper edge 1232 of the reflective sheet 123 in sequence, that is, the first radius r1 is smaller than the second radius r2, the second radius r2 is smaller than the third radius r3, and so on. In addition, the center O1 of the first dot 131 and the center O2 of the second dot 132 have a first distance G1, the center O2 of the second dot 132 and the center O3 of the third dot 133 have a second distance G2, and the second distance G2 is greater than the first distance G1. That is to say, the spacing of the dots increases sequentially from the lower edge 1231 to the upper edge 1232 of the reflective sheet 123.

In an embodiment, the distance between the first dot 131 and the second dot 132 is, for example, r1+r2, and the distance between the center O1 of the first dot 131 and the center O2 of the second dot 132 is, for example, 2(r1+r2). By analogy, the distance between the second dot 132 and the third dot 133 is, for example, r2+r3, and the distance between the center of the second dot 132 and the center of the third dot 133 is, for example, 2(r2+r3).

For example, the dots include the first dot 131 to the (N−1)th dot arranged from small to large. N is, for example, a positive integer greater than 2, wherein the height of the reflective sheet 123 is, for example, H, and the size of each dot is, for example, the diameter of a circle, wherein the size of the first dot 131 is, for example, H/10, and the size of the second dot 132 is, for example, H/9, the size of the third dot 133 is, for example, H/8, and the size of the (N−1)th dot is H/(10−N+2). The distance between the center O1 of the first dot 131 and the center O2 of the second dot 132 is, for example, H/10+H/9, and the distance between the center O2 of the second dot 132 and the center O3 of the third dot 133 is, for example, H/9+H/8, and so on.

The number of dots 131 that can be placed in the length direction of the reflective sheet 123 can be calculated through the following formula: there is a length L between the upper edge 1232 and the lower edge 1231 of the reflective sheet 123, when (1.5H/10)+2H/9+2H/8+ . . . +1.5H/(10−N+1) is greater than L, N−1 dots 131 are taken and formed on the reflective sheet 123. For example: when the sum of half of the size of the first dot 131 (i.e., 0.5H/10), the distance between the center of the first dot 131 and the center of the second dot 132 (i.e., H/10+H/9), the distance between the center of the second dot 132 and the center of the third dot 133 (i.e., H/9+H/8) . . . and half of the size of the Nth dot (i.e., 0.5H/(10−N+1)) is greater than the length L of the reflective sheet 123, it means that the length L on the reflective sheet 123 is not enough to accommodate the Nth dot, so that it can only accommodate the first dots to (N−1)th dots.

Referring to FIG. 2, in an embodiment, the upper edge 1232 of the reflective sheet 123 forms, for example, a light conversion strip 134, the light conversion strip 134 is, for example, a green fluorescent coating, and the matrix of light sources 122 is, for example, blue light diodes, the matrix of light sources 122 can emit a first light L1 (such as light) toward its surroundings or corners, and the first light L1 can be changed by the light conversion strip 134 to form a third light (such as green light), wherein the first light L1 and the third light are of different colors.

Alternatively, the light conversion strip 134 is, for example, a yellow fluorescent coating, and the first light L1 (such as blue light) is changed by the light conversion strip 134 to form a third light (such as yellow light), the third light and the first light L1 are different color lights. The first light L1 can be mixed with the third light to form white light. The light conversion strip 134 can emit the same color light as the light conversion coating in the above embodiment, but can also emit complementary light, which is not limited in the present invention.

In the embodiment, the light conversion strip 134 has a maximum width X, which is, for example, a maximum width that can compensate for the light mixing effect at the edge of the display device 100. The maximum width of the light conversion strip 134 that can be placed in the length direction of the reflective sheet 123 can be calculated through the following formula: $X=L-[(1.5H/10)+2H/9+2H/8+ \ldots +1.5H/(10-N+2)]$–allowable tolerance. The allowable tolerance is the process tolerance or dimensional tolerance of the light conversion strip 134, and the smaller the value, the smaller the dimensional tolerance, and the allowable tolerance is, for example, about 0.1 mm or negligible. That is to say, the maximum width X of the light conversion strip 134 can be obtained by subtracting the lengths of the first dot 131 to the (N−1)th dot from the length L of the reflective sheet 123.

The light conversion strip 134 and the light conversion coating may be formed on the reflective sheet 123 by, for example, jet printing, screen printing, glue dispensing or coating method. The light conversion strip 134 can be a single strip or a plurality of strips. For example, the light conversion strip 134 having a plurality of stripes arranged in parallel is formed on the upper area of the reflective sheet 123, and the light conversion layer is formed on the lower area of the reflective sheet 123 according to a plurality of dots 131 of different sizes. The upper area can be half or less than half of the lower area, and the ratio can be adjusted according to actual needs.

Figure 3:
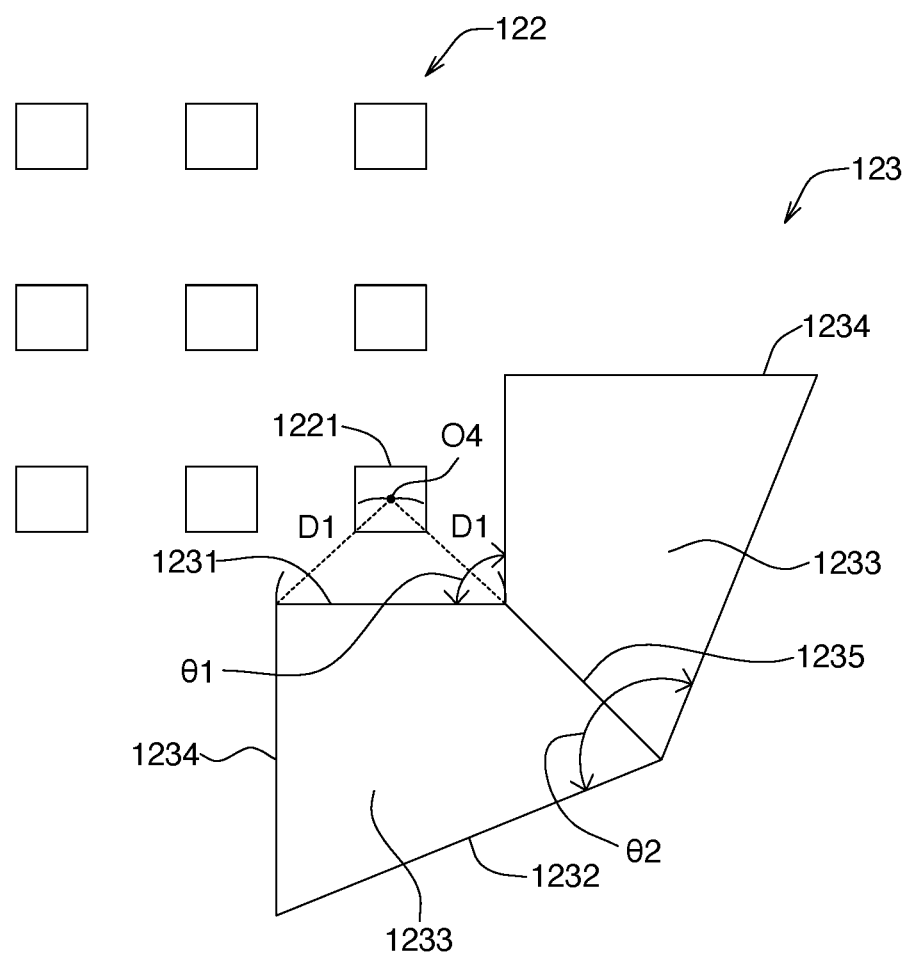
FIG. 3 is a schematic top view of a reflective sheet and an array light source according to an embodiment of the present invention.

Referring to FIG. 3, a schematic top view of the reflective sheet 123 and the matrix of light sources 122 according to an embodiment of the present invention. The reflective sheet 123 has a folded corner between two adjacent reflective surfaces 1233, the lower edge 1231 has a first included angle el at the folded corner, and the upper edge 1232 of the reflective sheet 123 has a second included angle $\theta 2$ at the folded corner. In the embodiment, in order to increase the opening area of the reflective sheet 123 sequentially from bottom to top, the reflective sheet 123 is inclined outward to dispose on the back plate 121, and the angle between the two adjacent reflective surfaces 1233 of the reflective sheet 123 will also increase sequentially from bottom to top. That is, the first included angle $\theta 1$ is smaller than the second included angle $\theta 2$, wherein the first included angle $\theta 1$ is, for example, a right angle (90 degrees), and the second included angle $\theta 2$ is, for example, an obtuse angle, such as 120 degrees to 135 degrees.

In another embodiment, the reflective sheet 123 is disposed on the back plate 121 vertically or obliquely, for example, and the angle between two adjacent reflective surfaces 1233 of the reflective sheet 123 remains fixed. That is to say, the first included angle $\theta 1$ is equal to the second included angle $\theta 2$, wherein the first included angle $\theta 1$ and the second included angle $\theta 2$ are, for example, right angles or close to right angles, such as 85 degrees to 95 degrees.

Referring to FIG. 3, taken the first light-emitting element 1221 closest to the reflective sheet 123 as an example, the first light-emitting element 1221 is located at a corner of the matrix of light sources 122, and the first light-emitting element 1221 faces a folded line 1235 of the reflective sheet 123 and the center O4 of the first light-emitting element 1221 is separated from the folded line 1235 and the side edge 1234 of the reflective sheet 123 by a first distance D1, respectively. The center O4 of the first light-emitting element 1221 is the vertex of the isosceles triangle, the first distance D1 is the length of two sides of the isosceles triangle, and the length of the lower edge 1231 of the reflective sheet 123 is, for example, the length of the base of the isosceles triangle. In order to enable the first light L1 emitted by the first light-emitting element 1221 to project on the two adjacent reflecting surfaces 1233, the center of the first light-emitting element 1221 and the folded line 1235 of the reflecting sheet 123 are connected to form a first straight line (that is, one side of the isosceles triangle), the center of the first light-emitting element 1221 and the side edge 1234 of the reflective sheet 123 are connected to form a second straight line (that is, the other side of the isosceles triangle), and the first straight line is substantially perpendicular to the second straight line. That is to say, the vertex of the isosceles triangle is, for example, 90 degrees, and the light conversion coating 130 is formed within the respective range defined by the two opposite side edges 1234 of the reflective sheet 123 and the folded line 1235, so that better light conversion effect can be obtained.

Although only a schematic top view of one corner of the matrix of light sources 122 is shown in FIG. 3, it is conceivable that the matrix of light sources 122 has four corners, and each corner can be correspondingly configured with a reflecting sheet 123. The first light-emitting elements 1221 located in four corners and the corresponding four reflective sheets 123 form four areas, so that the light can be reflected by the reflective sheets 123 in the respective areas to reach the edge area or corner area of the display device 100, and after the light is evenly distributed, the light is emitted out of the display panel 110 through the optical film 124.

To sum up, the display device 100 according to the above-mentioned embodiment of the present invention can avoid the problems of light leakage and uneven brightness distribution easily occurring at the four corners and/or around the conventional backlight module.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A display device, comprising:
    a display panel; and
    a backlight module arranged under the display panel, and the backlight module comprising:
    a matrix of light sources; and
    a reflective sheet disposed around at least one corner of the matrix of light sources, wherein the reflective sheet has an upper edge, a reflective surface and a lower edge, the upper edge is far away from the matrix of light sources relative to the lower edge, and a light conversion coating having a plurality of dots of different sizes is formed on the reflective surface, the matrix of light sources emits a first light toward the reflective sheet, and the first light is changed by the light conversion coating to form a second light, wherein the first light and the second light are of different colors.

2. The display device according to claim 1, wherein the dots of different sizes are arranged on the reflective sheet from small to large, and the sizes of dots are sequentially increased from a lower location on the reflective surface nearest the lower edge to an upper location on the reflective surface nearest the upper edge.

3. The display device according to claim 2, wherein spacings of the dots sequentially increase from the lower location to the upper location.

4. The display device according to claim 2, wherein the dots of different sizes comprise a first dot to (N−1)th dot arranged from small to large, and N is a positive integer greater than 2 and ranges from 4-11, wherein there is a height H between the upper edge and the lower edge of the reflective sheet, a size of the first dot is H/10, a size of the second dot is H/9, a size of the third dot is H/8, and a size of the (N−1)th dot is H/(10−N+2).

5. The display device according to claim 4, wherein a distance between a center of the first dot and a center of the second dot is H/10+H/9, and a distance between the center of the second dot and a center of the third dot is H/9+H/8.

6. The display device according to claim 5, wherein there is a length L between the upper edge and the lower edge of the reflective sheet, wherein
when (1.5H/10)+2H/9+2H/8+1.5H/7 is greater than L, the first dot to the third dot are formed on the reflective sheet.

7. The display device according to claim 1, wherein the reflective surface extends obliquely or vertically between the upper edge and the lower edge.

8. The display device according to claim 7, wherein the reflective sheet has a folded corner, the lower edge has a first included angle at the folded corner, and the upper edge of the reflective sheet has a second included angle at the folded corner, wherein the first included angle is less than or equal to the second included angle, the first included angle is a right angle.

9. The display device of claim 1, wherein the upper edge of the reflective sheet forms a light conversion strip, a first portion of the first light is changed by the light conversion coating to form the second light and a second portion of the first light is changed by the light conversion strip to form a third light, the third light and the first light are of different colors.

10. The display device according to claim 9, wherein the dots of different sizes comprise a first dot to (N−1)th dot arranged from small to large, and N is a positive integer greater than 2 and ranges from 4-11, wherein there is a height H between the upper edge and the lower edge of the reflective sheet, a size of the first dot is H/10, a size of the second dot is H/9, a size of the third dot is H/8, and a size of the (N−1)th dot is H/(10−N+2), a distance between a center of the first dot and a center of the second dot is H/10+H/9, a distance between the center of the second dot and a center of the third dot is H/9+H/8.

11. The display device according to claim 10, wherein there is a length L between the upper edge and the lower edge of the reflective sheet, wherein when (1.5H/10)+2H/9+2H/8+1.5H/7 is greater than L, the first dot to the third dot are formed on the reflective sheet.

12. The display device according to claim 11, wherein the light conversion strip has a maximum width X, where X=L−[(1.5H/10)+2H/9+1.5H/8].

13. The display device according to claim 9, wherein the light conversion strip is a green fluorescent coating, the matrix of light sources are blue light diodes, and the first light is magenta light.

14. The display device according to claim 1, wherein the light conversion coating is a green fluorescent coating, the matrix of light sources are blue light diodes, and the first light is magenta light.

15. The display device according to claim 1, wherein the matrix of light sources includes a plurality of light-emitting elements, a first light-emitting element of the light-emitting elements faces a folded line of the reflective sheet, and a distance from a center of the first light-emitting element to the folded line is the same as a distance from the center of the first light-emitting element to one side edge of the reflective sheet, and the light conversion coating is formed within a range defined by the side edge of the reflective sheet and the folded line.

16. The display device according to claim 15, wherein the center of the first light-emitting element and the folded line of the reflective sheet are connected to form a first straight line, and the center of the first light-emitting element and the side edge of the reflective sheet are connected to form a second straight line, and the first straight line is substantially perpendicular to the second straight line.

17. A display device, comprising:
a display panel;
a backlight module, disposed below the display panel, the backlight module comprising;
a matrix of light sources; and
a reflective sheet disposed at at least one corner of the matrix of light sources, the reflective sheet has an upper edge, a reflective surface and a lower edge, the upper edge is far away from the matrix of light sources relative to the lower edge, and a light conversion coating having a plurality of dots is formed on the reflective sheet, the matrix of light sources emit a first light toward the reflective sheet, the first light is changed by the light conversion coating to form a second light, wherein the first light and the second light are of different colors, the plurality of dots are arranged on the reflective sheet from small to large from the lower edge, and the sizes of the dots are sequentially increased from a lower location on the reflective surface nearest the lower edge to an upper location on the reflective surface nearest the upper edge.

18. The display device according to claim 17, wherein the upper edge of the reflective sheet forms a light conversion strip, a first portion of the first light is changed by the light conversion coating to form the second light and a second portion of the first light is changed by the light conversion strip to form a third light, the third light and the first light are of different colors.

19. The display device according to claim 17, wherein the reflective sheet has a folded line, wherein the matrix of light sources comprises a plurality of light-emitting elements, and a first light-emitting element of the light-emitting elements faces the folded line of the reflective sheet, and a distance from a center of the first light-emitting element to the folded line is the same as a distance from the center of the first light-emitting element to one side edge of the reflective sheet, and the light conversion coating is formed within a range defined by the side edge of the reflective sheet and the folded line.

20. The display device according to claim 19, wherein the reflective sheet has a folded line, wherein the center of the first light-emitting element and the folded line of the reflective sheet are connected to form a first straight line, the center of the first light-emitting element and the side edge of the reflective sheet are connected to form a second straight line, and the first straight line is substantially perpendicular to the second straight line.

* * * * *